US009638907B2

(12) United States Patent
Wallmeroth et al.

(10) Patent No.: US 9,638,907 B2
(45) Date of Patent: May 2, 2017

(54) DEVICE AND METHOD FOR EXPANDING A LASER BEAM

(75) Inventors: Klaus Wallmeroth, Zimmern o.R. (DE); Christoph Tillkorn, Villingendorf (DE); Ivo Zawischa, Villingen-Schwenningen (DE)

(73) Assignee: TRUMPF LASER GMBH, Schramberg (DE)

( * ) Notice: Subject to any disclaimer, the term of this patent is extended or adjusted under 35 U.S.C. 154(b) by 127 days.

(21) Appl. No.: 14/006,334

(22) PCT Filed: Mar. 15, 2012

(86) PCT No.: PCT/EP2012/054575
§ 371 (c)(1),
(2), (4) Date: Oct. 29, 2013

(87) PCT Pub. No.: WO2012/126804
PCT Pub. Date: Sep. 27, 2012

(65) Prior Publication Data
US 2014/0293406 A1 Oct. 2, 2014

(30) Foreign Application Priority Data
Mar. 21, 2011 (DE) .................. 10 2011 005 835

(51) Int. Cl.
*G02B 5/08* (2006.01)
*G02B 19/00* (2006.01)
*G02B 17/08* (2006.01)
*G02B 27/09* (2006.01)

(52) U.S. Cl.
CPC ..... *G02B 19/0028* (2013.01); *G02B 17/0812* (2013.01); *G02B 19/0095* (2013.01);
(Continued)

(58) Field of Classification Search
CPC ... H01S 5/4012; H01S 5/405; G02B 27/0977; G02B 19/0057; G02B 19/0028; G02B 5/08
See application file for complete search history.

(56) References Cited

U.S. PATENT DOCUMENTS

| 3,836,256 A | 9/1974 | Peters |
| 4,205,902 A | 6/1980 | Shafer |

(Continued)

FOREIGN PATENT DOCUMENTS

| CN | 101620317 A | 1/2010 |
| DE | 102007009318 A | 8/2008 |

(Continued)

OTHER PUBLICATIONS

International Search Report dated Jun. 1, 2012.
German Office Action dated Nov. 16, 2011.

*Primary Examiner* — Scott J Sugarman
*Assistant Examiner* — Balram Parbadia
(74) *Attorney, Agent, or Firm* — Fish & Richardson P.C.

(57) ABSTRACT

Methods and devices for expanding a laser beam are provided. In one aspect, a device includes a telescope arrangement having two spherical folding mirrors for expanding an incident collimated laser beam with a lens arranged in the divergent beam path downstream of the telescopic arrangement. The two spherical folding mirrors in the beam path are a first, convex-curved spherical folding mirror and a second, concave-curved spherical folding mirror, respectively. The lens has a spherical lens face for collimating the expanded laser beam from the telescope arrangement. The laser beam can be an ultraviolet (UV) laser beam.

16 Claims, 4 Drawing Sheets

(52) U.S. Cl.
CPC ......... *G02B 27/09* (2013.01); *G02B 27/0927* (2013.01); *G02B 27/0977* (2013.01)

(56) References Cited

U.S. PATENT DOCUMENTS

| | | | |
|---|---|---|---|
| 4,475,793 A | | 10/1984 | Ford |
| 4,691,999 A | * | 9/1987 | Wheeler ............ G02B 19/0033 359/641 |
| 4,830,445 A | * | 5/1989 | Robinson ................. G03H 1/24 353/88 |
| 5,321,718 A | * | 6/1994 | Waarts et al. ................. 372/108 |
| 6,842,293 B1 | * | 1/2005 | Yin ........................ G02B 27/30 359/641 |
| 7,525,708 B2 | | 4/2009 | Boettcher |
| 2008/0130007 A1 | * | 6/2008 | O'Connell .................... 356/450 |
| 2008/0252964 A1 | * | 10/2008 | Koenig ......................... 359/366 |
| 2009/0257118 A1 | | 10/2009 | Heritier et al. |
| 2009/0323176 A1 | | 12/2009 | Wei et al. |

FOREIGN PATENT DOCUMENTS

| | | |
|---|---|---|
| JP | 59154415 A | 9/1984 |
| JP | 01134981 A | 5/1989 |
| JP | 7144291 A | 6/1995 |
| JP | 07144291 A | 6/1995 |
| JP | 2001293588 | 10/2001 |
| JP | 2001293588 A | 10/2001 |
| JP | 20011293588 A | 10/2001 |
| JP | 2002026395 A | 1/2002 |
| JP | 2007136478 A | 6/2007 |
| JP | 2009520995 A | 5/2009 |

\* cited by examiner

DEVICE AND METHOD FOR EXPANDING A LASER BEAM

This application is a national stage application of International Application No. PCT/EP2012/054575 (WO 2012/126804 A1), filed Mar. 15, 2012 which is herein incorporated by reference in its entirety.

BACKGROUND

Field of the Invention

The present invention relates to a device for expanding a laser beam, in particular a UV laser beam, and an associated method for expanding a laser beam.

Background of the Invention

UV lasers, that is to say, lasers which produce laser radiation in the UV wavelength range (with wavelengths below the visible wavelength range) are becoming increasingly significant, particularly in microprocessing operations. This increases the demand for UV lasers of high and medium power. The production of ultraviolet laser radiation is often carried out by means of frequency conversion of an infrared laser beam in non-linear crystals. This frequency conversion requires on the one hand high infrared intensities and small beam divergence in the non-linear crystals in order to enable efficient conversion from the infrared wavelength range to the ultraviolet wavelength range. On the other hand, the intensity, in particular that of the UV radiation produced, may not become too high, in order to prevent the crystal from being destroyed or a rapid degradation of the optical properties thereof.

These requirements, for example (but not exclusively) in the case of ultra-short pulse lasers with UV pulse lengths in the range of approximately 5 ps and UV pulse energies of more than 1 µJ or in the case of pulse lengths of approximately 1 ps and UV pulse energies of more than 0.2 µJ, may lead to collimated or almost collimated UV laser beams of high intensity, whose diameter does not increase significantly over the extent of the conversion structure, that is to say, whose intensity does not significantly reduce over this length.

Permanent UV radiation with high intensity leads in transmissive optical units (for example, lenses or other optical units of quartz glass) and optionally also in the anti-reflective coatings thereof to undesirable permanent material changes which can impair the transmission properties of these transmissive optical units to the point of being unusable. Traces of various gases (for example, hydrocarbon or silicon compounds) in an imprecisely controlled environment of the optical units can also be changed by means of the UV radiation in such a manner that deposits occur on the optical units and may also lead to them becoming unusable after a period of time. In particular with very high intensities of the UV radiation, this degradation can occur so rapidly that economic use of transmissive optical units for UV laser beams is no longer possible.

In order to make collimated UV laser beams of high intensity produced in the manner described above usable for applications, it is necessary to expand them in such a manner that the intensity thereof over the desired period of use does not lead to damage of the following optical units (for example, beam guiding, beam shaping or processing optical units).

Although such an expansion could be achieved by means of a large propagation length of the laser beam as far as the following optical units, so that the laser beam would already per se become sufficiently large, in the present case, in which the laser beam is (almost) collimated, this is difficult to implement since a very high propagation length would be required and the structural size of the entire expanding optical unit is limited.

Conventionally, for beam expansion of (almost collimated) laser beams, devices are therefore used for beam expansion, for example, in the form of a Galilei objective lens 1 (cf. FIG. 1). Such an objective lens 1 has at least two lenses 2, 3 in order to convert an input collimated laser beam 4 into an (in this case 6 times) expanded similarly collimated laser beam 5. The Galilei objective lens 1 constitutes a beam expansion optical unit of simple construction and can be configured, with short structural length and typically small structural space using axially arranged spherical lenses 2, 3, in such a manner that they lead to very small beam deformations with a high level of tolerance with respect to the input beam position (that is to say, tilting or displacement of the input beam). With regard to the output beam divergence, radius errors of the lenses 2, 3 or errors in the input beam divergence can be compensated for by means of simple axial displacement of one of the lenses 2, 3, without a lateral displacement of the expanded laser beam 5 occurring.

However, in a disadvantageous manner the input-side lens 2 of the Galilei objective lens 1 is itself subjected to the high UV intensity of the laser beam 4 which has not yet expanded so that, in particular when a dielectrically anti-reflection-coated input-side lens 2 is used, an unacceptable degradation of the transmission properties thereof may occur. As a partial solution for this problem, the Galilei objective lens 1 may be operated with an uncoated input optical unit, that is to say, without any anti-reflective coating. However, power losses are produced in this instance owing to Fresnel reflexes on the uncoated lens 2. The problem of the radiation-related change or degradation of the lens material also remains.

It has been found that the impairment of the reflection properties of dielectric mirrors with intensive UV radiation is substantially smaller than the impairment of the transmission properties of transmissive optical units and in particular dielectrically anti-reflection-coated transmissive optical units. Therefore, mirror objective lenses for the beam expansion of UV radiation may achieve significantly longer operating times than lens systems.

FIG. 2 shows a telescope arrangement 6 having two spherical folding mirrors 7, 8 as reflective optical elements in a Z-shaped folding arrangement (in this case 6 times) for converting an input collimated laser beam 4 into an expanded collimated laser beam 5. The spacing between the folding mirrors 7, 8 is in this instance approximately 150 mm, the folding angle 2α which is identical for both folding mirrors 7, 8 is approximately 20°.

However, a non-axial mirror system for beam expansion, as shown, for example, in FIG. 2, generally has various disadvantages. Either aspherical optical elements are required in order to reduce astigmatism and coma which makes these systems expensive and sensitive to adjustment, or such systems, with a given tolerance of the application with respect to imaging errors, are limited to relatively large mirror radii and small folding angles, whereby a large structural form of the entire device is necessary, and/or these systems are limited to quite specific radius and folding angle combinations and beam properties (for example, convergent output beam (intermediate focal point)).

For the arrangement shown in FIG. 2, FIG. 3 shows four spot diagrams of the remote field of the mirror telescope 6 produced by means of simulations ("ray tracing"). For the input laser beam 4, a Gaussian intensity distribution was assumed, in which the $1/e^2$ diameter (that is to say, the diameter in which the intensity has dropped to $1/e^2$ times the maximum value) was 0.83 mm, that is to say, the output laser beam 5 should ideally have a $1/e^2$ diameter of 5 mm with the 6-times enlargement shown here. The pupil of the simulated mirror-telescope 6 was selected in this instance in such a manner that the calculated radius (of approximately 42 μrad) of the Airy disc 9 for a UV wavelength of 343 nm approximately corresponds to the divergence angle of a laser beam with Gaussian intensity distribution and $1/e^2$ diameter of 5 mm.

In addition to an axially orientated input beam, which is illustrated at the top left-hand side in FIG. 3, three additional beams with 0.2° deviation from the input axis of the laser beam were calculated and are illustrated at the top right and at the bottom left and bottom right. The scale size $S_1$ of the (square) angular range shown in FIG. 3 is in this instance 2000 μrad. Since the spots shown in FIG. 3 are substantially outside the circular Airy disc 9, the mirror telescope 6 is far from being limited in terms of diffraction for the input laser beam 4.

In general, with non-axial mirror telescopes such as the mirror telescope 6 shown in FIG. 2, the radius tolerances of the folding mirrors 7, 8 or defects in the collimation of the input beam 4 cannot be compensated for by simple displacement of an individual folding mirror 7, 8 without an undesirable lateral displacement of the output laser beam 5 occurring.

DE 10 2007 009 318 A1 also relates to the problem of the expansion of a high-energy laser beam. The solution described therein makes provision for the laser beam to be expanded by means of a transmitting or reflecting optical element in such a manner that the energy density which is to be associated remains below a critical energy density in order to prevent irreversible damage to the subsequent optical components. For beam expansion, in an embodiment, a cylindrical convex mirror which can be inclined through 45° relative to the laser beam and a convex cylinder lens are used. Owing to the inclination of the convex mirror through 45°, the energy density on the mirror surface is intended to be reduced by a factor of root 2 so that the mirror itself does not become damaged. The cylinder lens is intended to move the divergent expanded laser beam into a parallel beam path with an increased beam cross-section. However, this affords only the possibility of expanding the laser beam in one direction.

As an alternative to expansion in two directions, in another embodiment of DE 10 2007 009 318 A1, it is proposed to convert a device for beam expansion 10 (cf. FIG. 4) having a spherical-convex mirror 7 for beam expansion and two cylinder lenses 11, 12 which are orientated with their cylinder axes orthogonal relative to each other for converting the laser beam which is expanded in a divergent manner on the convex concave mirror 7 into an output collimated laser beam 5, that is to say, with a parallel beam path. Owing to the use of the cylinder lenses 11, 12, however, the device 10 is very susceptible to adjustment, as illustrated below with reference to FIG. 5 and FIG. 6.

FIG. 5 is an illustration similar to FIG. 3, the properties of the input laser beam 4 and the pupil corresponding to that of FIG. 3, but the scale size $S_2$ being smaller and being 200 μrad. In the spot illustration of the far-field illustrated at the top right-hand side in FIG. 3, all the beams or spots are located within the Airy disc 9, that is to say, the root-mean-square (RMS) radius of the beam distribution is significantly smaller than the radius (approx. 42 μrad) of the Airy disc 9, so that the optical unit shown in FIG. 4 is limited in terms of diffraction for the expanded laser beam 5 as long as the input beam is axially orientated. However, with an oblique beam incidence, small impairments of the imaging properties are produced, as can be seen with reference to the spot illustrations in FIG. 5 at the top left-hand side, bottom left-hand side and bottom right-hand side, in which the field angle of the incident laser beam 4 has been changed in various directions by 0.2°, the inlet aperture being located 150 mm in front of the convex mirror 7.

FIG. 6 is an illustration of a far-field spot diagram similar to FIG. 3 and FIG. 5, in which both the properties of the incident laser beam 4 and the pupil (and the scale size $S_2$) have been selected as at the top left in FIG. 5, but one of the cylinder lenses 11, 12 was tilted in each case through 0.2° about the beam direction. As can be seen clearly, a small misalignment of a respective cylinder lens 11, 12 leads to a powerful astigmatism of below approximately 45°, which leads to the far-field distribution not being limited in terms of diffraction since a plurality of spots come to rest outside the Airy disc 9 (radius approximately 37 μrad).

SUMMARY

An object of the present invention is to develop a device and a method of the type mentioned in the introduction in such a manner that a degradation of the optical units used as a result of intensive laser radiation can be avoided to the greatest possible extent, and that only small imaging errors are produced during the beam expansion.

This object is achieved according to the invention with a device for expanding a laser beam, in particular a UV laser beam, comprising: a telescope arrangement having two spherical folding mirrors for expanding the incident laser beam, and a lens which is arranged in the divergent beam path downstream of the telescope arrangement and which has a spherical lens face for collimating the expanded laser beam, the first folding mirror in the beam path being a convex-curved spherical folding mirror and the second folding mirror in the beam path being a concave-curved spherical folding mirror.

The inventors have recognised that, by using a combination of two spherical mirrors and a spherical lens as a divergence-correcting output element in the already expanded laser beam, beam expansions with a very small beam deformation or imaging errors significantly below the diffraction limit can be achieved, the folding angle on the folding mirrors being able to be freely selected over a relatively large range and the device being able to be produced with a relatively short structural shape. Since the lens is arranged in the laser beam which is already expanded and consequently is subjected to reduced laser intensity, the problem of the degradation of the transmissive optical units is resolved, as was illustrated in conjunction with the Galilei objective lens of FIG. 1.

Owing to the use of exclusively spherical optical units, the device for expanding the laser beam has a high tolerance with respect to errors in the input beam position and in the orientation of the individual optical elements (that is to say, the folding mirror or the lens). In addition, the production of spherical optical units of high precision is more simple and inexpensive than producing cylinder optical units or lenses with aspherical lens faces. Of course, the lens may have a spherical lens face (in combination with a planar face) or also two spherical lens faces, that is to say, the provision of an aspherical lens face can be dispensed with completely. It is also further self-evident that the telescope arrangement, in particular the second folding mirror in the beam path, in addition to expansion, can already take over a portion of the collimation so that the refractivity of the lens which produces the collimated laser beam can be reduced.

In an embodiment, the device comprises a displacement device for displacing the lens in the beam direction of the collimated laser beam. For the colligation of the output beam, any radius errors or a collimation error of the input beam can be compensated for in this manner by means of simple displacement of the output lens in an axial direction without lateral beam displacement occurring or other optical units having to be reorientated.

The first convex-curved folding mirror in the beam path in this instance takes over the actual beam expansion in the telescope arrangement. The second folding mirror in the beam path is a concave-curved spherical folding mirror, which acts together with the lens as a converging optical unit. In this manner, the required refractivity of the collecting optical units in the (partially) expanded beam is distributed over two optical elements. This has the advantage that small imaging errors are produced and in particular beam position errors or optical unit adjustment errors only have a small effect on the imaging properties. In this arrangement, a large portion of the optical aberrations (substantially astigmatism and coma) which occur at the first convex mirror which is arranged at an angle relative to the incidence direction of the laser beam can also be compensated for with the second folding mirror which is also located at an angle relative to the incidence direction of the (partially) expanded laser beam.

The lens is typically a planar convex lens whose convex spherical lens face faces away from the telescope arrangement so that the lens can be used for collimation of the laser radiation.

The radius of curvature of the spherical lens face is in this instance preferably adapted to the radii of curvature of the folding mirrors in such a manner that aberrations of the folding mirrors and aberrations of the lens substantially compensate for each other and the output, collimated laser beam has the desired expansion and is collimated as desired. For a desired expansion (for example, by the factor 1.42; 2; 3; 6; 10; 20; etc.) in addition to the radii of curvature, the spacings between the first folding mirror, the second folding mirror and the lens and the folding angles can also be selected in an appropriate manner. With the device according to the invention, the requirements with respect to folding angles and structural lengths are much smaller than with comparable expansion optical units having two spherical mirrors.

In an embodiment, a beam direction of the laser beam entering the telescope arrangement and a beam direction of the laser beam output from the telescope arrangement extend parallel with each other. In this so-called Z folding arrangement, in which the folding angles extend in opposing directions, so that the input and output laser beams extend almost parallel with each other and do not intersect, the folding angles can be selected freely over a wide range and the device can be produced with a relatively short structural shape, imaging errors being able to be compensated for particularly well. Of course, the folding angles on the two folding mirrors can in this instance be selected to be of the same size, but do not necessarily have to be selected to be of the same size.

In an alternative embodiment, the beam path of the laser beam entering the telescope arrangement intersects with the beam path of the laser beam output from the telescope arrangement. This variant which is also referred to as X folding and in which two folds in the same direction are used, with the same spacings between the optical elements (mirrors or lens) and the same folding angle values, generally has slightly worse imaging properties than Z folding, but still allows imaging which is limited in terms of diffraction. In particular with the X folding, the angle between the laser beam entering the telescope arrangement and the laser beam output from the telescope arrangement may be 90°.

In an embodiment, the device further comprises: a frequency conversion device for converting the frequency of the laser beam from a wavelength in the IR range to a wavelength in the UV range. To this end, the frequency conversion device may have, for example, non-linear crystals which enable the production of a collimated laser beam with a small diameter.

In particular, the device may also have a laser for producing the laser beam, which may have a wavelength in the IR range and in this instance is typically converted using the frequency conversion device into a laser beam having a wavelength in the UV range. For example, the IR laser may be an Nd:YVO$_4$ laser which produces laser radiation at a wavelength of 1064 nm so that the third harmonic thereof is approximately 355 nm and is consequently in the ultraviolet wavelength range. Alternatively, however, the laser may also be a Yb:YAG laser which produces laser radiation at a wavelength of 1030 nm so that the third harmonic is 343 nm.

In another embodiment, the device has a tilting device for tilting the lens relative to the beam direction of the expanded divergent laser beam. Owing to the tilting of the output lens relative to the beam direction of the divergent laser beam or the (desired) output direction, optical errors can be further reduced or, with optical errors which remain the same, larger folding angles or even smaller mirror radii and consequently smaller structural lengths can be produced.

The invention also relates to a method for expanding a laser beam, in particular a UV laser beam, by means of a telescope arrangement having two spherical folding mirrors, the first folding mirror in the beam path being a convex-curved spherical folding mirror and the second folding mirror in the beam path being a concave-curved spherical folding mirror, the method comprising: expanding an incident collimated laser beam at the first folding mirror in the beam path, and collimating the expanded laser beam at the second folding mirror in the beam path and at a lens which is arranged in the divergent beam path downstream of the telescope arrangement and which has a spherical lens face. The advantages described above in connection with the device accordingly apply to the method according to the invention.

Other advantages of the invention will be appreciated from the description and the drawings. The above-mentioned features and those set out below can also be used individually or together in any combination. The embodiments shown and described are not intended to be understood to be a conclusive listing but instead are of exemplary nature for describing the invention.

DETAILED DESCRIPTION OF THE DRAWINGS

Figure 7:
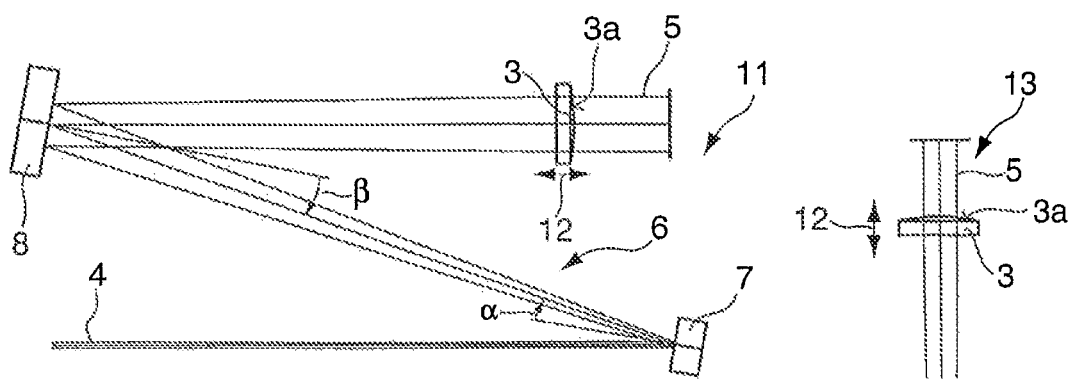
FIG. 7 shows an embodiment of a device according to the invention for beam expansion having a mirror telescope in a Z-folding arrangement and having a spherical output lens.

FIG. 7 shows a device 11 for beam expansion of an input collimated laser beam 4, which is expanded on a first convex folding mirror 7 of a telescope arrangement 6 and converted at a second, concave folding mirror 8 of the telescope arrangement 6 and at a lens 3 which is arranged downstream of the second folding mirror 8 in the divergent beam path into a collimated output laser beam 5 which is expanded 6 times in the present example. The folding mirrors 6, 7 are spherical mirrors, the lens 3 is a planar convex lens whose lens face 3a facing away from the second folding mirror 8 is curved in a spherical manner.

The arrangement of the folding mirrors 7, 8 shown in FIG. 7 enables a parallel orientation of the input-side laser beam 4 relative to the output-side laser beam 5 along a common beam axis (X direction) which is also referred to as a Z folding arrangement.

Owing to the combination of the two spherical folding mirrors 7, 8 in or close to the Z folding arrangement with the spherical lens 3 as a divergence-correcting output element in the already expanded, divergent beam path, with relatively large folding angles 2α, 2β which can be freely selected over a wide range at the two folding mirrors 7, 8 and with a relatively short structural form, beam expansions with very small beam deformation or imaging errors substantially below the diffraction limit can be achieved. Since the lens 3 is arranged in the expanded beam path, and the laser radiation therefore strikes it only with reduced intensity, damage to the lens 3 can be prevented or substantially reduced so that the lens material, for example, quartz glass is damaged by the laser radiation only insignificantly.

In order to size the device 11 in an appropriate manner, in a first step the required expansion of the input laser beam 4 is first determined (for example, 1.42 times, 2 times, 3 times, 6 times, . . . , 10 times, . . . , 20 times, etc.). If the expansion is determined (in this instance: 6 times), an appropriately sized structural space is defined for the device 11 and a suitable positioning of the folding mirrors 7, 8 is selected in the structural space. In this instance, there is a comparatively high degree of freedom in terms of the selection of the folding angles 2α, 2β and the spacings between the optical elements (that is to say, between the folding mirrors 7, 8 and the lens 3).

Together with the spacings, the spherical curvature of the folding mirrors 7, 8 and the spherical lens face 3a of the lens 3 is determined in such a manner that, on the one hand, the desired expansion is achieved and, on the other hand, the aberrations of the folding mirrors 7, 8 and the aberrations of the folding mirrors 7, 8 and the lens 3 substantially compensate for each other, and the output laser beam 5 is collimated as desired. The folding angle 2α (in this instance: approx. 20°) at the first folding mirror 7 and the folding angle 2β (in this instance: approx. 20°) at the second folding mirror 8 may but do not have to be selected to be the same in this instance. The spacing between the folding mirrors 7, 8 is in this instance approximately 150 mm, but this may naturally also be selected to be larger or smaller.

A displacement device 12, for example, in the form of a (linear) motor which enables axial displacement of the lens 3 in the beam direction (X direction) in order to adjust the divergence of the output laser beam 5, without the occurrence of lateral beam displacement or a correction by means of other optical elements being required, is indicated in FIG. 7 by means of a double-headed arrow.

Figure 8:
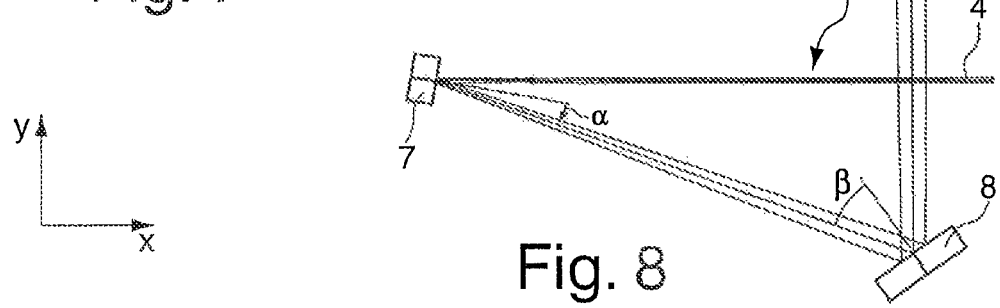
FIG. 8 shows another embodiment of the device according to the invention for beam expansion having a mirror telescope in an X-folding arrangement.

As an alternative to the device 11 shown in FIG. 7, in which the folding mirrors 7, 8 are arranged in a Z folding arrangement, it is also possible to arrange the folding mirrors 7, 8 in a so-called X folding arrangement in which the incident laser beam 4 extends in a first beam direction (X direction) and the output laser beam 5 extends in a second beam direction (Y direction), the two laser beams 4, 5 intersecting, of, the device 13 shown in FIG. 8, in which the incident and output laser beams 4, 5 define an angle of 90° relative to each other. The folding angle 2α (in this instance: 20°) at the first folding mirror 7 and the folding angle 2β (in this instance: 70°) at the second folding mirror 8 are in this instance selected to be different. The folding mirrors 7, 8 comprise at the surface a material which is highly reflective for UV laser radiation, for example, dielectric layer systems based on quartz glass. Of course, other material combinations with good UV reflection properties and high UV resistance can also be used.

Figure 9:
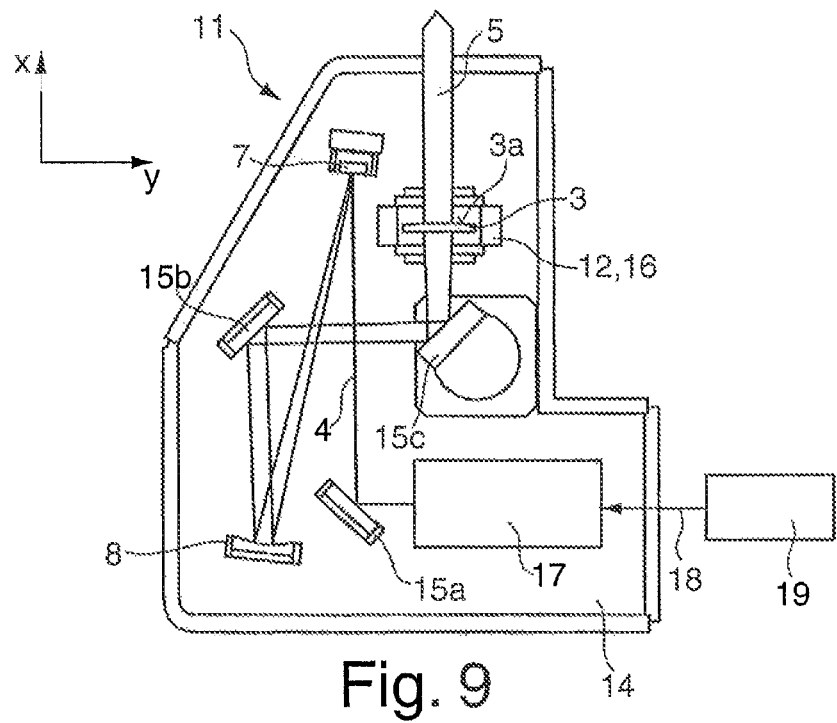
FIG. 9 is an illustration of the device of FIG. 7 with a frequency conversion device and an IR laser.

FIG. 9 shows the device 11 of FIG. 7 on an optical module 14 which defines the structural space. There are fitted to the optical module 14, in addition to the optical elements described in FIG. 7, that is to say, the lens 3 and the two folding mirrors 7, 8 arranged in a Z folding arrangement, three additional planar folding mirrors 15a to 15c, in order to make optimum use of the structural space available. In addition to the displacement direction 12, for displacing the lens 3 in a beam direction (X direction), a tilting device 16 indicated in FIG. 9 can also be fitted to the lens 3, in order to tilt it relative to the X direction or relative to the divergent laser beam. Owing to the tilting at an appropriate angle, the optical errors can be further reduced, and/or larger folding angles at the folding mirrors 7, 8, smaller radii of curvature of the folding mirrors 7, 8 or smaller structural lengths can be achieved. It is self-evident, however, that a tilting of the lens 3 is not absolutely necessary and an imaging which is limited in terms of diffraction can also be achieved without tilting.

The radii of curvature of the folding mirrors 7, 8 and the spherical lens face 3a, with an approximate 3-fold to approximately 6-fold expansion, are typically approximately 100-300 mm for the first folding mirror 7, approximately 1000-2000 mm for the second folding mirror 8, or approximately 200-400 mm for the lens 3, in order to achieve the desired refractivity for the expansion. The spacing between the second folding mirror 8 and the lens 3 may in this instance, for example, be in the range between approximately 100 mm and 150 mm. It is self-evident that it is possible to deviate from the above-mentioned value ranges, in particular when an expansion is intended to be carried out which is outside the prescribed range (3 times to 6 times).

It is also possible to see in FIG. 9 a frequency conversion device 17 which is arranged on the module 14 and which is for converting the frequency of an irradiated laser beam 18 whose wavelength is in the infrared spectral range into a wavelength in the ultraviolet spectral range. The frequency conversion device 17 has non-linear crystals in order to achieve the frequency conversion in a manner conventional for the person skilled in the art. FIG. 9 also shows an infrared laser 19, in the present example in the form of a Yb:YAG laser, which produces IR laser radiation having a wavelength of 1030 nm, which is converted in the frequency conversion device 17 into a UV laser beam with high radiation intensity and a wavelength of approximately 343 nm. Of course, other laser types, for example, an Nd:YVO$_4$ laser can also be used to produce the IR laser beam 18. With the Nd:YVO$_4$ laser, the laser wavelength is 1064 nm and the third harmonic produced in the frequency conversion device 17 is approximately 355 nm.

Figure 1:
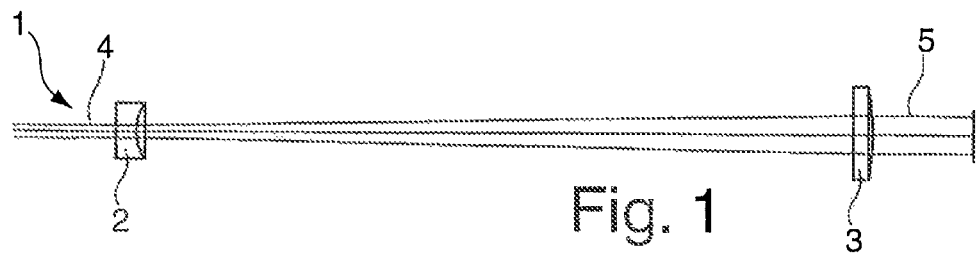
FIG. 1 is a schematic illustration of a device for expanding a laser beam in the form of a Galilei telescope.
Figure 2:
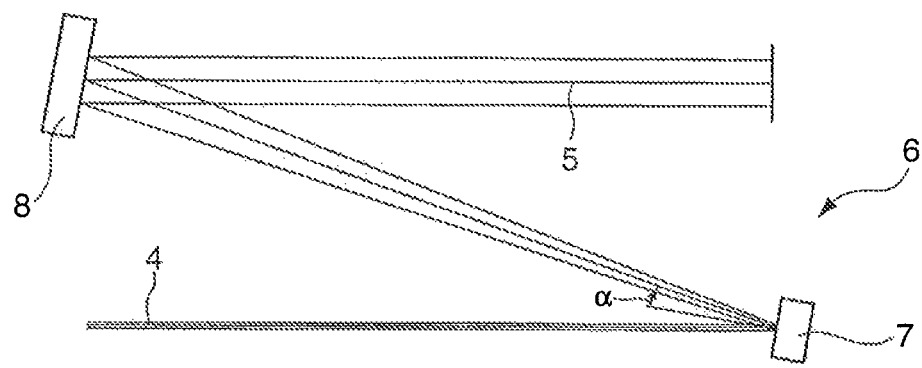
FIG. 2 is a schematic illustration of a device for expanding a laser beam in the form of a mirror telescope.
Figure 3:
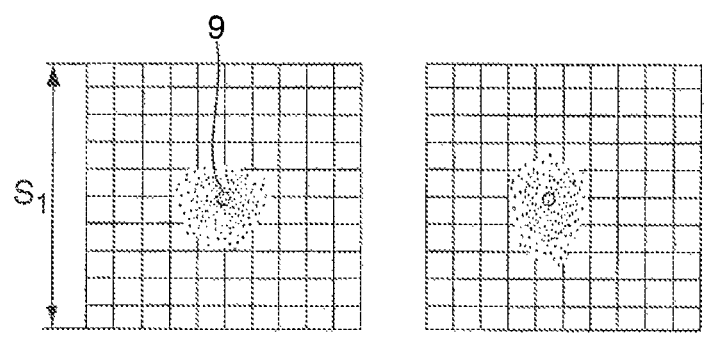
FIG. 3 shows illustrations of the far-field of the expanded laser beam produced using the mirror telescope shown in FIG. 2, with different angles of incidence of the input beam.
Figure 3:
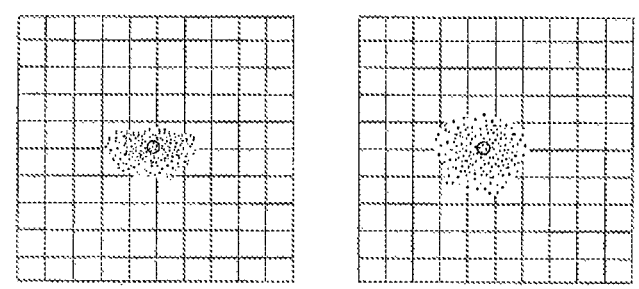
Figure 4:
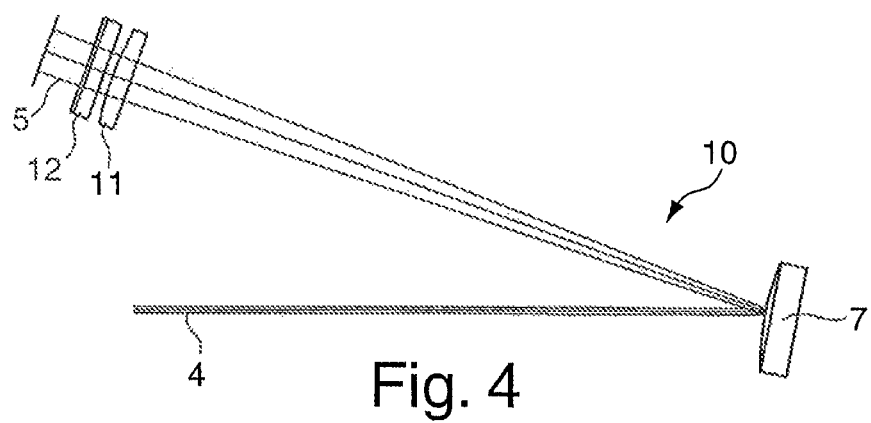
FIG. 4 is an illustration of a device for beam expansion having a convex mirror and two cylinder lenses.
Figure 5:
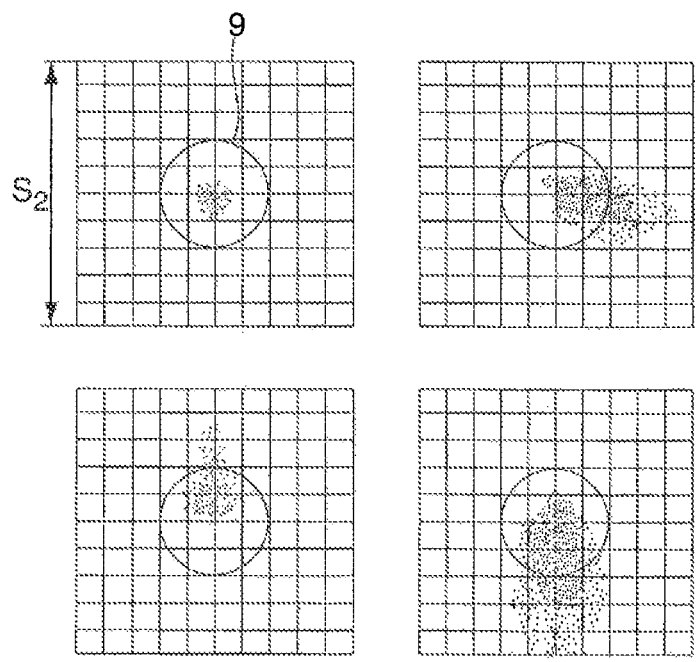
FIG. 5 shows illustrations of the far-field of the device of FIG. 4 with different angles of incidence of the input beam.
Figure 6:
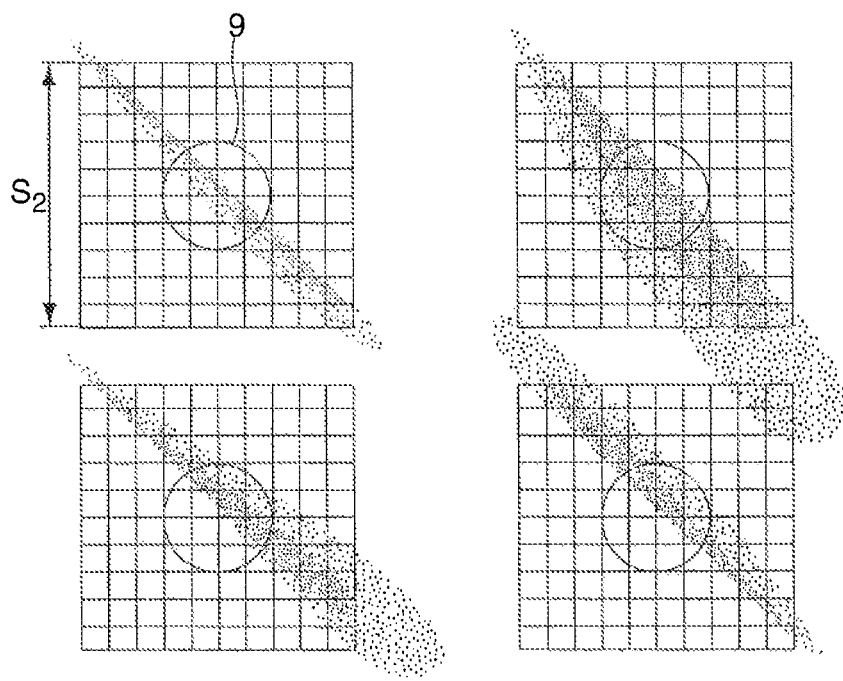
FIG. 6 shows illustrations of the far-field of the device of FIG. 4 with one of the cylinder lenses being tilted.
Figure 10:
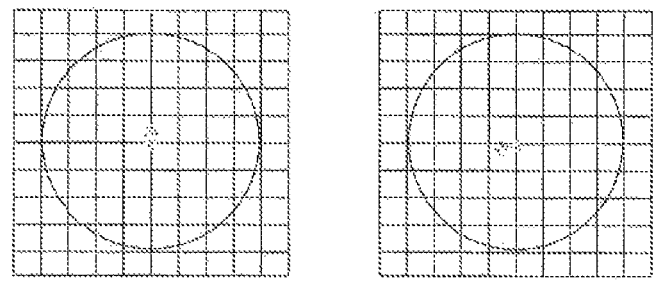
FIG. 10 is an illustration of the far-field of the device of FIG. 7 with different input angles of the laser beam.

A spot diagram of the far-field of the output collimated laser beam 5 obtained by means of the device 11 shown in FIG. 9 is illustrated in FIG. 10, the input beam properties and the pupil being selected to be identical to FIG. 3, FIG. 5 and FIG. 6 and only the scale S$_3$ being reduced to 100 μrad. As can clearly be seen in FIG. 10, the spots are located in the example shown far within the Airy disc 9, that is to say, the RMS radius of the beam distribution is substantially smaller than the Airy radius (approx. 42 μrad) so that the optical unit shown in FIG. 9 is limited in terms of diffraction for the laser beam 4, 5 or for the expanded imaging. However, this does not apply to an incidence of the laser beam 4 in the direction of the beam axis (X direction), as shown in FIG. 10 at the top left-hand side, but also for the spot diagrams shown in FIG. 10 at the top right-hand side, bottom left-hand side and bottom right-hand side in which the field angle was changed in various spatial directions by approx. 0.2°, the input aperture with the simulation being arranged 150 mm in front of the first folding mirror 7. In the case of non-axial incidence of the laser beam 4, an imaging which is limited in terms of diffraction can consequently also be achieved using the device 11.

In summary, using the above-described devices 11, 13, an expansion of the laser beam 4 can be achieved, whilst at the same time avoiding the degradation of the optical units 3, 7, 8 owing to intensive laser radiation, with the imaging errors on the whole being able to be kept small owing to mutual compensation of the imaging errors of the individual optical elements 3, 7, 8 and an imaging which is limited in terms of diffraction thus being able to be obtained.

What is claimed is:

1. Device for expanding a laser beam, comprising:
    a telescope arrangement having first and second spherical folding mirrors; and
    a transparent lens arranged downstream of the telescope arrangement and having a spherical lens face,
    wherein the first folding mirror comprises a convex-curved spherical folding mirror configured to expand a collimated laser beam incident on the convex-curved spherical folding mirror, and
    wherein the second folding mirror comprises a concave-curved spherical folding mirror arranged in a divergent beam path from the first spherical folding mirror and configured to keep the divergent beam path divergent and to act together with the lens in the divergent beam path as an optical unit to collimate the expanded laser beam.

2. Device according to claim 1, further comprising:
    a displacement device configured to displace the lens in a beam direction (X, Y) of the expanded collimated laser beam.

3. Device according to claim 1, wherein the lens is a planar convex lens whose convex spherical lens face faces away from the telescope arrangement.

4. Device according to claim 1, wherein a beam direction (X) of the laser beam entering the telescope arrangement and a beam direction (X) of the laser beam output from the telescope arrangement extend parallel with each other.

5. Device according to claim 1, wherein the beam path of the laser beam entering the telescope arrangement intersects with the beam path of the laser beam output from the telescope arrangement.

6. Device according to claim 1, further comprising:
    a frequency conversion device for converting the frequency of the laser beam from a wavelength in the infrared (IR) range to a wavelength in the ultraviolet (UV) range.

7. Device according to claim 1, further comprising:
    a laser for producing the laser beam.

8. Device according to claim 7, wherein the laser beam produced from the laser has a wavelength in the IR range.

9. Device according to claim 1, further comprising:
    a tilting device for tilting the lens relative to the beam direction (X, Y) of the expanded divergent laser beam.

10. Device according to claim 1, wherein the incident collimated laser beam comprises a UV laser beam.

11. Device according to claim 10, wherein surfaces of the first and second spherical folding mirrors comprise a material that is highly reflective for UV laser radiation.

12. Device according to claim 1, wherein radii of curvature of a plurality of optical elements including the spherical lens face, the convex-curved spherical folding mirror, and the concave-curved spherical folding mirror are mutually adapted to each other, so that an output beam from the lens is collimated and aberrations from the plurality of optical elements substantially compensate for each other to obtain an imaging limited in terms of diffraction.

13. A method of expanding a laser beam comprising:
    expanding a collimated laser beam incident at a first, convex-curved spherical folding mirror of a telescope arrangement; and
    collimating the expanded laser beam by an optical unit comprising:
        a second, concave-curved spherical folding mirror of the telescope arrangement arranged in a divergent beam path from the first, convex-curved spherical folding mirror, and
        a transparent lens arranged in the divergent beam path downstream of the telescope arrangement and having a spherical lens face,
    wherein the second, concave-curved spherical folding mirror is configured to keep the divergent beam path divergent and to act together with the lens in the divergent beam path to collimate the expanded laser beam.

14. The method of claim 13, wherein the incident collimated laser beam comprises a UV laser beam.

15. The method of claim 14, wherein surfaces of the first, convex-curved and second, concave-curved spherical folding mirrors comprise a material that is highly reflective for UV laser radiation.

16. The method of claim 13, wherein radii of curvature of a plurality of optical elements including the spherical lens face, the first, convex-curved folding mirror, and the second, concave-curved folding mirror are mutually adapted to each other, so that an output beam from the lens is collimated and aberrations from the plurality of optical elements substantially compensate for each other to obtain an imaging limited in terms of diffraction.

* * * * *